US010999161B2

(12) United States Patent
Lacey et al.

(10) Patent No.: US 10,999,161 B2
(45) Date of Patent: May 4, 2021

(54) METHOD AND ARRANGEMENT FOR LICENCE MANAGEMENT IN NFV NETWORK ENVIRONMENT

(71) Applicant: Comptel Oy, Helsinki (FI)

(72) Inventors: Stephen Lacey, Helsinki (FI); Antti Koskela, Helsinki (FI); Simon Osbourne, Helsinki (FI)

(73) Assignee: Comptel Oy, Helsinki (FI)

( * ) Notice: Subject to any disclaimer, the term of this patent is extended or adjusted under 35 U.S.C. 154(b) by 248 days.

(21) Appl. No.: 15/964,202

(22) Filed: Apr. 27, 2018

(65) Prior Publication Data

US 2019/0334788 A1    Oct. 31, 2019

(51) Int. Cl.
*H04L 12/24*    (2006.01)
(52) U.S. Cl.
CPC .............................. *H04L 41/5041* (2013.01)
(58) Field of Classification Search
CPC .... G06F 21/105; H04L 41/00; H04L 41/5041
See application file for complete search history.

(56) References Cited

U.S. PATENT DOCUMENTS

| 2010/0205303 A1* | 8/2010 | Chaturvedi | G06F 21/10 |
| | | | 709/226 |
| 2016/0253211 A1* | 9/2016 | Franco | H04L 67/1097 |
| | | | 705/7.25 |

(Continued)

FOREIGN PATENT DOCUMENTS

| EP | 3319298 A1 * | 5/2018 | .......... G06F 21/105 |
| KR | 20170100292 A | 9/2017 | |

(Continued)

*Primary Examiner* — Gil H. Lee (57) ABSTRACT

The invention relates to an electronic arrangement for dynamically and automatically controlling the usage of software components in connection with a network function virtualization (NFV) platform in a communications network comprising a mobile network, the arrangement comprising at least one data interface for transferring data, at least one processing unit for processing instructions and other data, and memory for storing the instructions and other data, said at least one processing unit being configured, in accordance with the stored instructions, to cause: obtaining first information indicative of instantiated virtualized network functions (VNF) and licences associated therewith, and second information indicative of a VNF licence that is available for allocation to an instance of a related VNF in accordance with terms and conditions as stipulated by the VNF licence; determining, based on the obtained first and second information, whether a licence currently allocated to an existing instance of a VNF, or the existing VNF instance itself, is to be replaced with the available licence, or with a new instance of said related VNF associated with the available licence, respectively, wherein a number of selected criteria are utilized to compare the currently allocated licence with the available licence having regard to the concerned terms and conditions as well as network resource information including usage information regarding the existing instance of the VNF based on data obtained from the network; and responsive to a positive determination, allocating the available licence to the existing VNF instance or to said new instance of said related VNF that is instantiated, the licence currently allocated to the existing VNF instance being released and in the latter case also the existing VNF instance being de-instantiated.

26 Claims, 5 Drawing Sheets

(56) References Cited

U.S. PATENT DOCUMENTS

| | | | | |
|---|---|---|---|---|
| 2017/0104609 A1* | 4/2017 | McNamee | ............ | H04L 63/06 |
| 2017/0161470 A1* | 6/2017 | Feng | ............ | G06F 21/105 |
| 2018/0007127 A1* | 1/2018 | Salapura | ............ | H04L 67/1023 |

FOREIGN PATENT DOCUMENTS

| | | | | |
|---|---|---|---|---|
| WO | WO-2017000630 A1 * | 1/2017 | ............ | G06F 21/10 |
| WO | 2017188682 A1 | 11/2017 | | |
| WO | 2018024341 A1 | 2/2018 | | |

* cited by examiner

METHOD AND ARRANGEMENT FOR LICENCE MANAGEMENT IN NFV NETWORK ENVIRONMENT

TECHNICAL FIELD OF THE INVENTION

The present invention pertains to mobile communication networks and networks connected therewith, user terminals operable in such network and related control arrangements and methods. More specifically, however not exclusively, the invention concerns a method and arrangement for managing licences in connection with network function virtualization (NFV) architecture.

BACKGROUND OF THE INVENTION

The concepts of software-defined networking (SDN) and NFV have gained severe interest during the past few years as they enable creating software-based networks that are more programmable, scalable, and affordable than traditional networks based on more or less specialized hardware.

NFV is basically about virtualizing tasks previously done in hardware by translating various networking tasks as load balancing, routing, and intrusion detection and prevention into software executable in a cloud on virtual machines using commodity hardware, whereas SDN is, in turn, about translating the associated control plane for managing virtualized network functions (VNF) into software. NFV and SDN are often considered as mutually exclusive, but also combined solutions incorporating aspects of both concepts have been set forth.

ETSI (European Telecommunications Standards Institute) has established standards for designing and implementing NFV systems. For example, ETSI GS NFV-MAN 001 NFV; Management and Orchestration, V1.1.1 (2014-12), incorporated herein by reference in its entirety, describes the management and orchestration framework required for the provisioning of VNFs and related operations.

In traditional networks, network function (NF) implementations are usually tightly coupled with the infrastructure they run on, while NFV decouples software implementations of NF's from the computation, storage, and networking resources used for their realization. The virtualisation environment insulates the NFs from those resources through a virtualisation layer.

Figure 2:
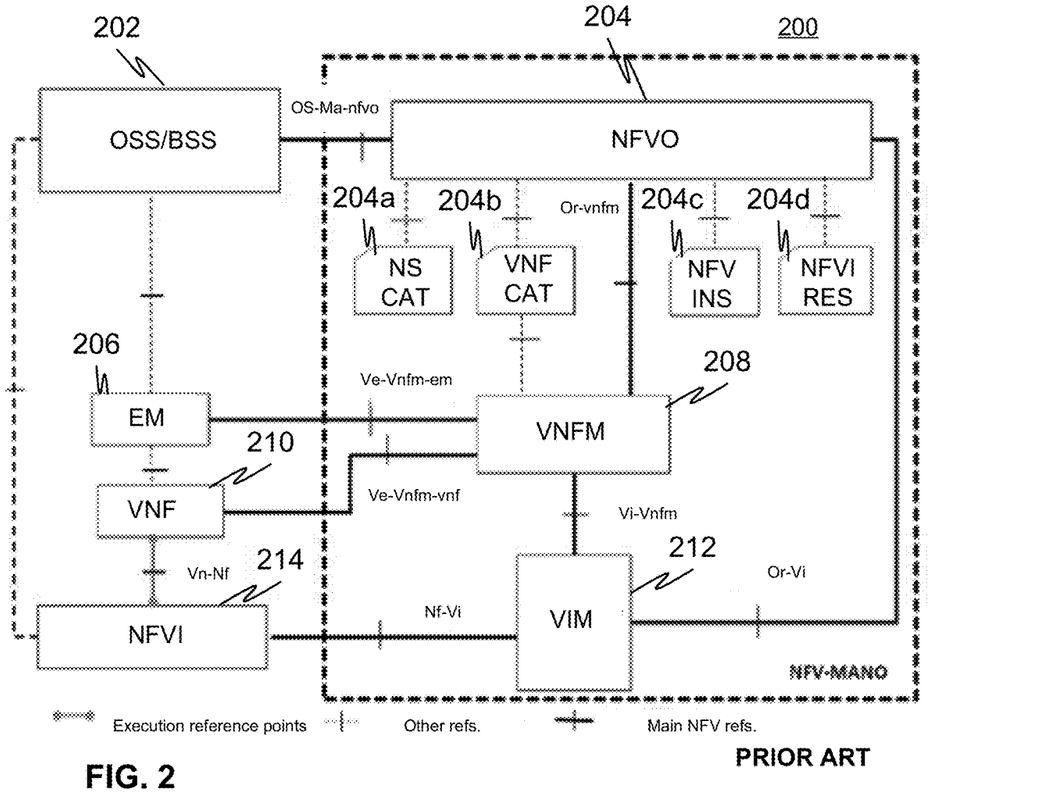
FIG. 2 depicts the NFV-MANO architectural network.

FIG. 2 represents, at 200, Network Functions Virtualisation Management and Orchestration (NFV-MANO) architectural framework as defined by the ETSI for managing the resources of NFVI (NFV Infrastructure) and orchestrating their allocation as needed by various network services (NS) and VNFs 210 used to implement them. One or more VNFs and/or Physical Network Functions (PNFs) may be connected to realize an NS. The framework includes computing, networking, storage, and virtual machine (VM) resources. The VNF Manager (VNFM) 208 manages the life cycles of VNFs. In addition, the NFV Orchestrator (NFVO) 204 manages the life cycles of network services utilizing the VNFs.

In more detail, VIM (Virtualized Infrastructure Manager) 212 takes care of managing NFVI resources in its target domain (there may be many in the overall NFV architecture) by creating, maintaining and deleting virtual machines (VM) from available physical resources, creating and maintaining virtual links, virtual networks, sub-nets, and ports to support the management of VNFFGs (VNF Forwarding Graph, chaining VNFs to establish desired end-to-end services), maintaining software images for VNFs 210, collecting performance and fault data, and managing catalogs of virtualized resources, resource configurations (e.g. virtual CPU configurations, types of network connectivity, etc.) or templates, for example.

NFVI 214 encompasses the actual hardware (e.g. compute, storage, and networking) and software (e.g. hypervisors) components that together provide the infrastructure resources where VNFs 210 are ultimately deployed for execution. The NFVI 214 may also include partially virtualised NFs. Examples of such partially virtualised network functions are related to "white box" switches, hardware load balancers, DSL Access Multiplexers (DSLAMs), Broadband Remote Access Server (BRAS), Wi-Fi access points, CPEs, etc., for which a certain part of the functionality is virtualised and may thus be in the scope of NFV-MANO 200 while other parts can be built in silicon (PNF, physical network function) due to e.g. physical constraints (e.g. digital interfaces to analogue physical channels) or vendor design choices.

Element Management (EM) 206 is responsible for the FCAPS (Fault, Configuration, Accounting, Performance and Security management) for a VNF 210. The EM 206 may collaborate with a VNF Manager (VNFM) 208 to perform those functions that require exchange of information regarding the NFVI resources associated with the VNF 210.

The VNFM 208 manages the life cycle of VNFs 210 by setting them up, maintaining, scaling and ultimately terminating them, for instance. It 208 also takes care of FCAPs of VNFs for the virtual part. A single VNFM 208 may manage multiple VNFs or just one. For example, when a VNF is to be instantiated (or scaled), the VNFM consults a corresponding VNF Descriptor (VNFD), to perform the following:

- allocate and configure NFVI resources (compute, storage and network resources);
- load or install the software components of the VNF; for example, using a repository of software images provided in a VNF Package;
- set up virtualized network connectivity between the VNF components and other network elements; and
- connect the VNF to the operations support system (OSS) layer and manage and monitor it during its lifetime.

OSS/BSS 202 refers to the combination of the operator's other operations and e.g. business support functions that are not otherwise explicitly captured in the shown architectural framework 200, but are expected to have information exchanges therewith. OSS/BSS functions 202 may provide management and orchestration of legacy systems and may have full end to end visibility of services provided by legacy network functions in an operator's network.

NFV Orchestrator (NFVO) 204 handles the automatic management of network services' life cycle and of global NFV Infrastructure resources potentially across multiple data centers.

The NFVO 204 may connect, or chain together, different functions to create end-to-end services in the NFV environment. In addition, the NFV Orchestrator manages NFV infrastructures e.g. among multiple VIMs 212 and coordinates resource requests. In practice, the NFVO 204 generates, maintains and deletes network services of one or more VNFs through communication with VNFM 208 and VIM 212. An end-to-end service of multiple VNFs from one or more vendors may be thereby created by communicating with the respective VNFMs 208.

The NFVO 204 on-boards various descriptors. For example, so-called NSDs, VNFFGDs, and VLDs, which are described in more detail hereinbelow, are "on-boarded" into the NS Catalog 204a, whereas VNFD is on-boarded in the VNF Catalog 204b, as part of a VNF Package including the VNFD and e.g. software images. Also PNFDs (physical network function descriptor) can be on-boarded.

In connection with NFV, on-boarding may, as a term, generally refer herein to registering a target entity such as a network service in a corresponding catalog, typically incorporating storing a related indication such as a deployment template (e.g. NSD) therein, and ensuring that the necessary related templates describing the entity such as NS are on-boarded (duly received and registered) as well. On-boarding may further involve e.g. data validation and/or harmonization, or "normalization". Responsive to receipt of an actual service order, actual instantiation of the on-boarded entity may be then then triggered.

Network Services (NS) Catalog 204a indeed refers to a repository of all on-boarded Network Services, enabling the creation and management of the NS deployment templates with reference to e.g. a Network Service Descriptor (NSD) including a plurality of information elements that enable the NFVO 204 to instantiate (deploy) the concerned NS formed by VNFFG(s), VNF(s), PNF(s), and/or VL(s). The information elements of the descriptor contain references other descriptors, which describe components that are part of that Network Service, including e.g. VNFFGD(s), VNFD(s), possible PNFD(s) and VLD(s) utilized by the NS.

A VNFFGD (VNFG Forwarding Graph Descriptor) is a deployment template which describes a topology (VNFFG) of the Network Service, or a portion of the Network Service, by referencing VNFs and PNFs and Virtual Links that connect them, i.e. it defines a service chain of VNFs to determine the service. VNFs contain connection points by which VNFs may be connected together by establishing virtual links (VL) therebetween. The VNFFG defined by the VNFFGD contains a Network Forwarding Path (NFP) element that defines a sequence of actions that are to be performed, for example, by a collection of VNFs, to provide the requested service.

A Virtual Link Descriptor (VLD) describes in more detail e.g. the resource requirements that are needed for a link between VNFs, PNFs and endpoints of the Network Service, which could be met by various link options that are available in the NFVI).

Onboarding of an NS thus incorporates registering the NS, based on the obtained service specification data, in the catalog 204a. For example, instantiation of a network service is described by a related VNFFG, which defines the set of network functions that are required to execute the requested service.

A VNFD is a deployment template which describes a VNF in terms of its deployment and operational behaviour requirements. It is used e.g. by the VNFM in the process of VNF instantiation and lifecycle management of a VNF instance. The information provided in the VNFD is also used by the NFVO to manage and orchestrate Network Services and virtualised resources on the NFVI. The VNFD may also contain connectivity, interface and KPIs requirement information. As mentioned above, the VNFD is on-boarded in a VNF Catalog, as part of a VNF Package.

VNF Catalog 204b represents the repository of (all) on-boarded VNFs in terms of VNF Packages, thus supporting the creation and management of the VNF Package (including e.g. VNF Descriptor (VNFD), software images, manifest files, etc.) via interface operations provided by the NFVO 204. Both NFVO 204 and VNFM 208 can query the VNF Catalog 204b for finding and retrieving a VNFD, to support different operations (e.g. validation or checking instantiation feasibility).

Figure 3:
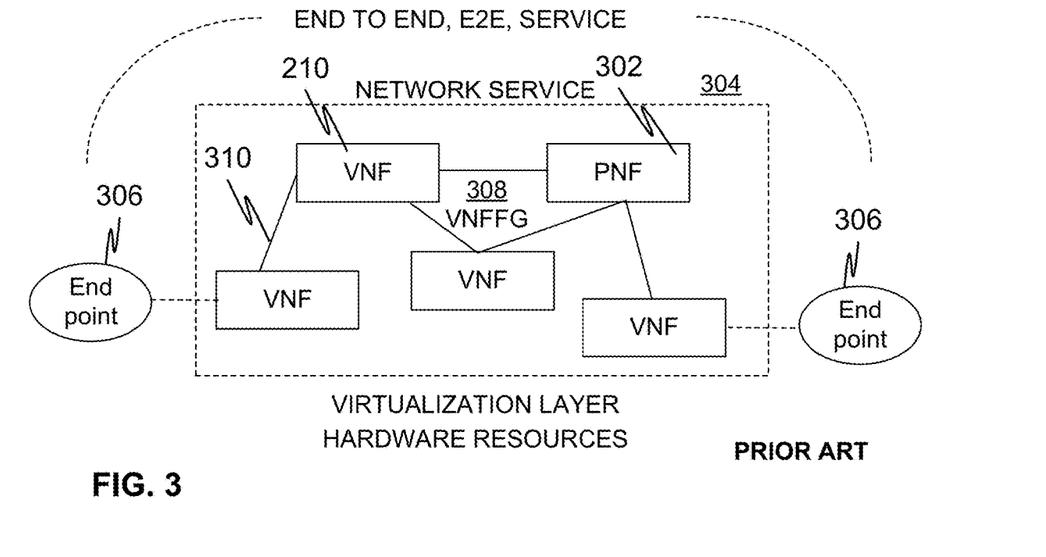
FIG. 3 illustrates the structure of one example of an end-to-end service incorporating at least one network service.

FIG. 3 illustrates the structure of one example of an end-to-end service incorporating at least one network service, NS 304, wherein the related VNFFG(s) 308 defined by corresponding VNFFGD(s) describe a topology of the NS or at least a portion of the NS, by referencing VNFs 210, possible PNFs 302 and Virtual Links 310 that connect them between the end points 306.

To construct a desired end-to-end, E2E, service, multiple Network Services can be combined with reference to combining e.g. mobile radio access network service with mobile core network service. For clarity reasons, only a single NS has been depicted in the figure but there could thus be several interconnected, even nested, network services in a common service chain to establish the desired E2E service.

Reverting to FIG. 2, NFV Instances repository 204c may hold information of all VNF instances and Network Service instances deployed (realized). Each VNF instance is represented by a VNF record, and each NS instance is represented by an NS record. Those records are updated during the lifecycle of the respective instances, reflecting changes resulting from execution of NS lifecycle management operations and/or VNF lifecycle management operations. This supports NFVO's and VNFM's responsibilities in maintaining the integrity and visibility of the NS instances, respectively VNF instances, and the relationship between them.

NFVI Resources repository 204d may hold information about available/reserved/allocated NFVI resources as abstracted by the VIM across operator's Infrastructure Domains, thus supporting information useful for resources reservation, allocation and monitoring purposes. As such, the NFVI Resources repository plays an important role in supporting NFVO's Resource Orchestration and governance role, by allowing NFVI reserved/allocated resources to be tracked against the NS and VNF instances associated with those resources (e.g. number of VMs used by a certain VNF instance at any time during its lifecycle).

In the light of the foregoing, onset of virtualisation in telecommunication networks will drive the proliferation of software assets deployed into data centers through new real-time automated processes. High levels of automation and scale are necessary to meet the elastic nature of the network as it meets the demands of the consumer/corporate services.

As being appreciated by a person skilled in the art, software licences are generally applicable in various functional domains of network architectures based on NFV with reference e.g. to the MANO, VNF, and NFVI.

A service provider may be deploying VNFs from many VNF providers, or VNF/software vendors, with various terms and agreement for use, for instance. Runtime VNFs instances are thus to be automatically managed and orchestrated by the MANO, preferably based on applicable licensing policies and business models. As the NFV generally aims for flexibility, scalability and resulting benefits in terms of e.g. cost savings, intelligent, rapid management of VNF licences is of major importance. Such management should advantageously not negatively affect the service availability or continuity, not beyond the constraints set by the concerned licence terms anyway.

While actual procurement or management of NFV related licences is not within the scope of e.g. general ETSI standardization regarding the NFV MANO, they have still published a document ETSI GR NFV-EVE 010 "NFV Licensing Management; Report on Licence Management for NFV", which is incorporated herein by reference in its entirety, discussing the features usually considered advantageous if not mandatory within the MANO framework to support harmonized licence management for NFV, including recommendations by way of VNF licence use cases regarding support for licence management within the NFV architectural and NFV-MANO frameworks. Functional components in charge of licence management such as specifically VNF licence management should be provided in the network and exploited, e.g. by the MANO, to enable the life cycle of each VNF instance to be managed also according to the licence management policies applicable in addition to further requirements, objectives, and constraints.

NFV licences such as VNF licences will impact on-boarding and subsequent management of concerned VNF Packages. The effect of VNF licences needs to be considered in various VNF instance related operations, such as life cycle management, including instantiation (deployment) and de-instantiation. VNF licence information will thus translate into runtime policies for operations of VNF instances.

Publicly available commercial solutions and even research papers for managing NFV licences such as VNF licences are very limited or basically non-existent. Features going beyond basic licence allocation or deallocation have not been suggested in more detail.

Accordingly, in order to manage NFV infrastructure including NS's and VNFs a service provider would appreciate having an accurate record of e.g. the assets and licences deployed, the software vendors/assets available, commercial contracts and procurement procedures, audit/settlement processes, support/maintenance agreements, migration, and real-time insight/optimisation tools for successfully dealing with such.

SUMMARY OF THE INVENTION

In the light of foregoing, one objective of the present invention is to at least alleviate one or more of the above problems, which can be attained by the provision of an NFV licence management solution capable of dynamically and flexibly (re) assessing the allocation of licences in connection with an NFV architecture based network upon need.

According to one aspect, an electronic arrangement for dynamically and automatically controlling the usage of software components in connection with an NFV platform in a communications network comprising a mobile network, comprises at least one data interface for transferring data, at least one processing unit for processing instructions and other data, and memory for storing the instructions and other data, said at least one processing unit being configured, in accordance with the stored instructions, to cause:

obtaining first information indicative of instantiated (already instantiated or ongoing instantiation) virtualized network functions and licences associated therewith, and second information indicative of a VNF licence that is available for allocation to an instance of a related VNF in accordance with terms and conditions as stipulated by the VNF licence, determining, based on the obtained first and second information, whether a licence currently allocated to an existing instance of a VNF, or the existing VNF instance itself, is to be replaced with the available licence, or with a new instance of said related VNF associated with the available licence, respectively, wherein a number of selected criteria are utilized to compare the currently allocated licence with the available licence having regard to the concerned terms and conditions as well as network resource information including usage information regarding the existing instance of the VNF based on data obtained from the network, and responsive to a positive determination, allocating the available licence to the existing VNF instance or to said new instance of said related VNF that is instantiated, the licence currently allocated to the existing VNF instance being released and in the latter case also the existing VNF instance being de-instantiated.

A licence may basically become available for use by (and brought into knowledge of) the arrangement and related VNF instances by a variety of ways. For example, a licence previously allocated to an instance of a VNF may be released (de-allocated) due to the instance being de-instantiated (terminated). Alternatively, a previously unused fresh licence may be received e.g. via a licence procurement system or directly from a VNF vendor offering the related VNF. Such may take place in connection with on-boarding of the VNF and e.g. related network service, or separate therefrom.

At least portion of current licence information may be stored in a repository that may be called a licence pool. The pool may be configured to store indication of available, non-allocated VNF licences, for example. The arrangement may host such pool or be at least operatively, either directly or via intermediate entities such as orchestrator or other NFV platform entity, connected thereto. In various embodiments, the arrangement may be configured to allocate or control allocating a licence from the pool by an appropriate registration procedure and correspondingly return/release or control returning a licence from use back to the pool.

Different applicable mechanisms to obtain information on instantiated virtualized network functions and available (VNF) licences may vary as well as being easily apprehended by a person skilled in the art. They may be push or pull based, for example, and rely upon various triggers such as event and/or time based triggers.

It shall be worth mentioning that in some embodiments, "available" licence may also refer to a licence that is currently allocated, but can be re-allocated rapidly, preferably substantially immediately or at least within a selected period, from the standpoint of the operation of the arrangement and licence usage optimization mechanism offered by it.

In various embodiments, the related VNF (i.e. VNF related to the available licence) may match to the existing, already instantiated VNF, which often implies (if not stipulated otherwise by e.g. related terms/conditions or adopted VNF management practice) that the already instantiated VNF may be updated with new licence (available licence) without a need to terminate the existing VNF instance and instantiate a new copy with new licence associated therewith (which is still one possibility).

The new licence (available licence) may still change the functioning or capacity of the existing VNF in cases where the licence data control over the performance of the VNF. Indeed, the available licence may, having regard to content thereof with reference to e.g. related terms and conditions, represent updated, revised or otherwise different version of the currently allocated licence.

In various supplementary or alternative embodiments, the related VNF associated with the available licence may differ from the existing, already instantiated VNF, meaning that if the capabilities/capacity under the available licence is to be implemented according to the determination, an instance of the related VNF shall be deployed instead of allocating the available licence to the existing VNF instance. Naturally, the capabilities and performance of the instance of the related VNF shall still preferably overlap with the existing VNF. The related VNF may provide capabilities or performance similar to the existing VNF but they may also go beyond or fall short from the ones of the existing VNF, for example.

In various supplementary or alternative embodiments, a process of allocating a licence comprises preferably exclusively associating a licence key identifying said available licence with said existing or new VNF instance. The arrangement may be configured to control or execute such allocation and optionally de-allocation (release) process.

In various supplementary or alternative embodiments, the network resource information utilized includes or indicates at least one element selected from the group consisting of: available computational resources, available memory resources, available data transfer resources, used computational resources, used memory resources, used data transfer resources, resources utilized or required by the existing instance of the VNF, resources available within host or domain, such as PoP or NFVO domain, of the existing instance of the VNF, usage location of the existing instance of the VNF, location of the existing instance of the VNF, host or domain location of the existing instance of the VNF, user of the existing instance of the VNF, number of users of the existing instance of the VNF, extent of usage of the existing instance of the VNF optionally per time period, number of usage times of the existing instance of the VNF per time period, and resources utilized or required by the available licence or said related VNF executed under said available licence. The "availability" in connection with resources and resource information may herein refer to general existence or connectivity, or more specifically, e.g. (currently) remaining unused capacity of the concerned entity, i.e. an available resource or resource entity can be considered to be a resource/entity present in the inspected system or being at least usable therethrough, or it may be required that it actually has free capacity for executing additional operations such as data processing, communication or storage operations.

In various supplementary or alternative embodiments, the number of criteria incorporate network resource information, optionally the type and/or extent of available, used or required resources and/or distance between locations.

In various supplementary or alternative embodiments, the process of determining incorporates determining characteristics, such as type and/or extent, of estimated, intended, or desired future usage of at least the existing VNF instance, preferably based on current usage, and comparing the determined characteristics with available network resources and/or terms and conditions of the currently allocated licence.

Yet, it may be estimated whether the existing VNF instance and the licence currently allocated thereto can cater for the characteristics.

Correspondingly, the process of determining may incorporate determining characteristics, such as extent, of estimated, intended, or desired future usage of at least the existing VNF instance, and comparing the determined characteristics with available network resources and/or terms and conditions of the available licence.

Again, it may be estimated whether the available licence and instance of said related VNF, optionally matching to the existing VNF already instantiated and thus potentially enabling merely updating its current licence with the available one, can cater for the characteristics.

In various supplementary or alternative embodiments, the process of determining incorporates determining whether the currently allocated licence or the available licence will serve characteristics of estimated, intended, or desired future usage of at least the existing VNF instance, optionally further of the additional usage the related VNF, being different from the existing VNF, could enable, better according to said number of criteria.

Making a positive determination resulting in switchover to the available licence (either with the existing VNF instance or new VNF instance) may involve finding the existing or new VNF instance associated with the available licence superior to the existing VNF instance associated with the currently allocated licence based on at least at least one criterion selected from the group consisting of: lower resource usage, lower load, better user experience, lower latency, higher throughput, lower transmission delay, higher or lower reserve capacity, and higher communication rate. Such criteria are naturally merely examples of preferred criteria but as easily comprehended by a skilled person, additional or alternative criteria may be adopted depending on each particular embodiment.

In various supplementary or alternative embodiments, the process of determining incorporates determining the cost, optionally by means of at least one cost function, of current usage and/or estimated, intended, or desired future usage of at least the existing VNF instance in contrast to the cost of such usage but based on replacing the currently allocated licence with the available licence or replacing the existing VNF instance with a new VNF instance associated with the available licence.

The available licence may be then allocated to the existing instance of the VNF or to the new instance of said related VNF in case the associated cost is lower in contrast to the currently allocated licence, for example.

From the standpoint of cost-based determination, the cost may include at least one element selected from the group consisting of: financial cost, and technical cost, optionally determined based on various network resource information discussed herein.

In various embodiments, the terms and conditions of currently allocated and/or available licence may indicate at least one element selected from the group consisting of: max. number of users or sessions, max. number of simultaneous users or sessions, max. number of users in general, max. throughput, max. extent of usage such as tasks executed, data input, data processed or data output, optionally per time period, geographical extent of allowed usage, allowed usage per time constraint such as seconds, minutes or hours per day, week or month, allowed number of usage times per time period, and allowed method of monitoring, reporting or validating licence usage, such as declarative licensing.

Accordingly, comparison of such requirements with actual resource information and especially resource usage characteristics involving the VNF(s) under scrutiny such as the aforesaid existing VNF instance, reflecting past, current or estimated/intended/desired future situation, may be utilized by the arrangement in the determination process to decide upon the possible switchover to new licence and possible new VNF.

The arrangement may in some embodiments comprise an NFV orchestrator or NFV orchestration platform, optionally incorporating MANO compliant platform.

Yet, the arrangement may comprise at least one data repository hosting at least one catalog indicative of on-boarded network services (NS) and virtualized network functions (VNF) available for use.

Still, the arrangement may comprise at least one data repository indicative of current VNF instances and network service instances deployed.

Still further, the arrangement may be at least operably connected, via applicable interface(s), to at least one element selected from the group consisting of: OSS, BSS, procurement system or database, VNF vendor system, and contract system or database.

To offer multi-purpose connectivity, the arrangement may implement an API, optionally REST based API, for transferring data such as licence data or licence related control data, optionally including allocation, release, procurement, query or usage data relative to target entities such as different network elements or (external) systems.

In accordance with one other aspect, a method for dynamically and automatically controlling the usage of software components by an electronic arrangement in connection with a network function virtualization (NFV) platform in a communications network comprising a mobile network, comprises:
- obtaining first information indicative of instantiated virtualized network functions (VNF) and licences associated therewith, and second information indicative of a VNF licence that is available for allocation to an instance of a related VNF in accordance with terms and conditions as stipulated by the VNF licence;
- determining, based on the obtained first and second information, whether a licence currently allocated to an existing instance of a VNF or the existing VNF instance itself is to be replaced with the available licence or new instance of said related VNF associated with the available licence, respectively, wherein a number of selected criteria are utilized to compare the currently allocated licence with the available licence having regard to the concerned terms and conditions as well as network resource information including usage information regarding the existing instance of the VNF based on data obtained from the network; and
- responsive to a positive determination, allocating the available licence to the existing VNF instance or to said new instance of said related VNF that is instantiated, further releasing the licence currently allocated to the existing VNF instance and in the latter case also de-instantiating the existing VNF instance.

According to a further aspect, software product, embodied in a non-transitory computer readable carrier medium, comprises instructions causing an executing computer to execute method items described above and generally discussed also herein elsewhere.

The utility of the present invention arises from multiple factors depending on each particular embodiment thereof.

Generally, the present invention yields dynamic, highly automated and optionally substantially real-time, decision and management platform for controlling and optimizing usage of network resources from the standpoint of available NFV entities or elements, especially VNFs and related licences.

Various embodiments of the solution suggested herein may be conveniently implemented by an electronic arrangement, which may be integral with e.g. NFV/MANO platform or specifically, NFV orchestrator of the network, or a separate arrangement that is still functionally connected to the NFV/MANO platform or the orchestrator and at least operably to e.g. related repositories or catalogs therein.

For example, functionality of an existing (instantiated) VNF may be updated in accordance with a new licence becoming available and allocated thereto and/or, depending on the embodiment, the existing instantiated VNF may be replaced with new VNF and related licence so that functionality of the network nevertheless better caters for current or future needs as assessed based on the available information such as measured and/or estimated characteristics on current or future resource usage in the network, which may refer to extrapolated, intended and/or desired usage, for example. Different cost aspects, with reference both to financial cost and technical cost, may be taken into account in the decision-making.

Various embodiments of the present invention basically enable service providers to more effectively manage their own digital supply chains. The present invention may be implemented as vendor or service provided specific, internal solution for feature control in a network in terms of e.g. VNFs and related licences. However, the possibilities of the solution go far beyond that as it equally well suits many cross-platform or end-to-end orchestration scenarios wherein there may be several sources of NFV resources such as VNFs for constructing e.g. chains therefrom for offering optimal, versatile network services to end users connected to the network by means of e.g. mobile terminal or laptop/desktop computer, both alike.

As alluded to above, the present invention may indeed be implemented as a separate entity that is external to e.g. any particular orchestration platform but still operably connected therewith in terms of e.g. communication, or internal to and possibly integral with a selected NFV platform or NFV entity such as orchestrator.

A technical realization of the invention, such as an electronic arrangement of one or more servers and/or other elements, may be flexibly provided with a number of communication interfaces and e.g. APIs, such as REST, for offering different levels of connectivity between the realization and other entities of the NFV infrastructure, orchestration platform, and relevant northbound systems such as OSS/BSS systems.

The present invention may be validly implemented in a great variety of communication networks and associated virtualization architectures. Examples of such a network include mobile communication networks such as Long Term Evolution (LTE), (other) 4G compliant or almost compliant networks, and 5G networks under development. Further examples of applicable network technologies are provided hereinlater.

In some embodiments, the optimization procedures described herein for controlling the usage of software components such as VNFs in a network may generally apply one or more selected predictive technologies and/or machine learning.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, may be best understood from the following description of specific, still merely exemplary, embodiments when read in connection with the accompanying drawings.

Finally, numerous considerations provided herein concerning different embodiments of the arrangement may be flexibly applied to the embodiments of the method mutatis mutandis, and vice versa, as being appreciated by a skilled person.

The term "VNF licence" may refer herein to a collection of legal rights to use a VNF in accordance with terms (e.g. entitlements, restrictions) and conditions specified by the VNF licensor, wherein "using a VNF" can include e.g. accessing, copying, distributing, installing and executing the VNF software, depending on the licence's terms and conditions. The licence may be realized, for example, as, as one or more digital files or other data entities.

The expression "a number of" refers herein to any positive integer starting from one (1), e.g. one, two, or three.

The expression "a plurality of" refers herein to any positive integer starting from two (2), e.g. two, three, four.

BRIEF DESCRIPTION OF THE DRAWINGS

Next the invention will be described in greater detail with reference to exemplary embodiments in accordance with the accompanying drawings, in which.

DETAILED DESCRIPTION

Different embodiments of the present invention may be utilized in a variety of network architectures and technologies, which include e.g. mobile networks of so-called 3G, 4G or 5G type, incorporating NFV (network function virtualization) based networks, and/or hybrid networks incorporating features from both traditional (proprietary) mobile networks and NFV architecture.

To provide a more specific example, the suggested, at least partly virtualized, network solution may be implemented in connection with LTE (Long Term Evolution) network, i.e. a network scheme recommended by the 3rd Generation Partnership Project (3GPP), where the communications are, instead of more traditional circuit-switched connections, carried over an IP channel from user equipment (UE), via OFDM-based (Orthogonal Frequency Division Multiplexing) E-UTRAN (Evolved UMTS Terrestrial Radio Access Network) air interface, to an all-IP core, the Evolved Packet Core (EPC).

The EPC is a multi-access core network that basically enables operators to provide a common packet core network for 3GPP radio access (LTE, 3G, and 2G), non-3GPP radio access (HRPD, WLAN, and WiMAX), as well as fixed access (Ethernet, DSL, cable, and fiber). Different interworking specifications have been issued by the 3GPP for the purpose.

The EPC thus provides gateway access to other networks, operator services, applications, the Internet, etc. while ensuring an acceptable Quality of Experience (QoE) and charging a subscriber for their particular network activity. Even though LTE is in many contexts referenced as 4G technology, the basic LTE does not as such completely fulfill the requirements originally set for 4G wireless service by ITU-R, whereupon it is often considered to fall under the "almost" 4G or "first generation 4G" category, whereas a more recent enhancement thereof named as LTE Advanced meets the requirements more literally.

With reference to a scenario 100 of FIG. 1, a merely exemplary network environment is illustrated in connection of which an embodiment of the invention may be implemented.

User devices (UE) 104a, 104b, 104c of users (subscribers) 102a, 102b and 104c, respectively, may refer to wired or wireless terminals, e.g. smartphones, tablets, wearable electronics devices, laptops or desktop computers, which may be functionally connected to a communications network 110 by a suitable wireless transceiver, for example, to access desired communication services offered by the network 110 such as voice calls 105a, internet (web/WWW) access 105b and/or various messaging services or applications 105c.

The network 110, which may be a telecommunications network, may comprise a mobile network, which in turn comprises comprise one or more core networks 112A, such as the EPC in connection with LTE type network architecture. The UE's 104a, 104b, 104c may connect to the core network 112A via at least one radio access network (RAN) 112B. In the specific example of LTE, the access network(s) 112B may comprise eNodeB type base stations.

IP network or generally PDN (packet data network) may be utilized to connect different parts such as LTE and 3G sub-networks of the overall network architecture considered together.

Through the network environment and associated network elements such as gateways, the UE's 104a, 104b, 104c may further have access to other networks, e.g. the internet, and/or a number of external systems such as external networks and related entities, such as orchestration platforms, various external catalogs, and/or OSS/BSS system(s) of service provider(s).

In preferred embodiments, a number of virtualization technologies such as NFV (network function virtualization) and generally cloud architecture have indeed been applied to virtualize at least some of the functionalities provided by the network 110 as contemplated hereinbefore. Yet, in some embodiments, SDN (software defined network) may have been applied to separate data and control planes thereof.

Therefore, the network 110 shall preferably comprise, in addition to or instead of proprietary equipment implementing different network elements and related functionalities, various NFV management, orchestration (MANO) and implementation related entities such as general-purpose, commodity servers to host virtualized network functions (VNF) 111 on top of hypervisor-created virtual machines in accordance with network architecture as shown e.g. in FIG. 2, to establish required network services in congruence with the afore-discussed sketch of FIG. 3, for example.

Hardware for realizing network elements and associated functionalities are indicated as item 118 in the figure notwithstanding their nature (proprietary vs generic/NFV), while item 120 specifically refers to the arrangement of the present invention, which may be, be included in or incorporate e.g. NFV orchestrator or specifically NFV E2E orchestrator of the network 110, and optionally further elements of the MANO architecture, for example. The arrangement 120 may thus contain one or more devices, such as servers, at least operably connected together. In the case of several connected devices, the arrangement 120 may thus be called as a system as well. Yet, the arrangement 120 may contain or be at least functionally connected to a number of repositories 106 including e.g. a licence pool, a network service catalog, a VNF catalog, an NFV instances repository, and/or an NFVI resource repository.

The arrangement 120 may contain at least one processing unit 122 such as a microprocessor, microcontroller and/or a digital signal processor. The processing unit 122 may be configured to execute instructions embodied in a form of computer software 126 stored in a memory 128, which may refer to one or more memory chips, for example, separate or integral with the processing unit 122 and/or other elements. The memory 128 may store various further data in addition to mere program instructions. It may, for example, host the aforementioned data repository called as a catalog.

The software 126 may define one or more applications for executing the activities described herein. A computer program product comprising the appropriate software code means may be provided. It may be embodied in a non-transitory carrier medium such as a memory card, an optical disc or a USB (Universal Serial Bus) stick, for example. The software could also be transferred as a signal or combination of signals wired or wirelessly from a transmitting element to a receiving element.

Item 124 refers to one or more data interfaces such as wired network and/or wireless network interfaces, or in practice network adapters, for providing communication capability to the arrangement 120 to exchange data with external systems and elements. An UI (user interface) such as a web-based UI or other remote UI may be provided and optionally at least partially implemented by means of the interface 124.

Figure 1:
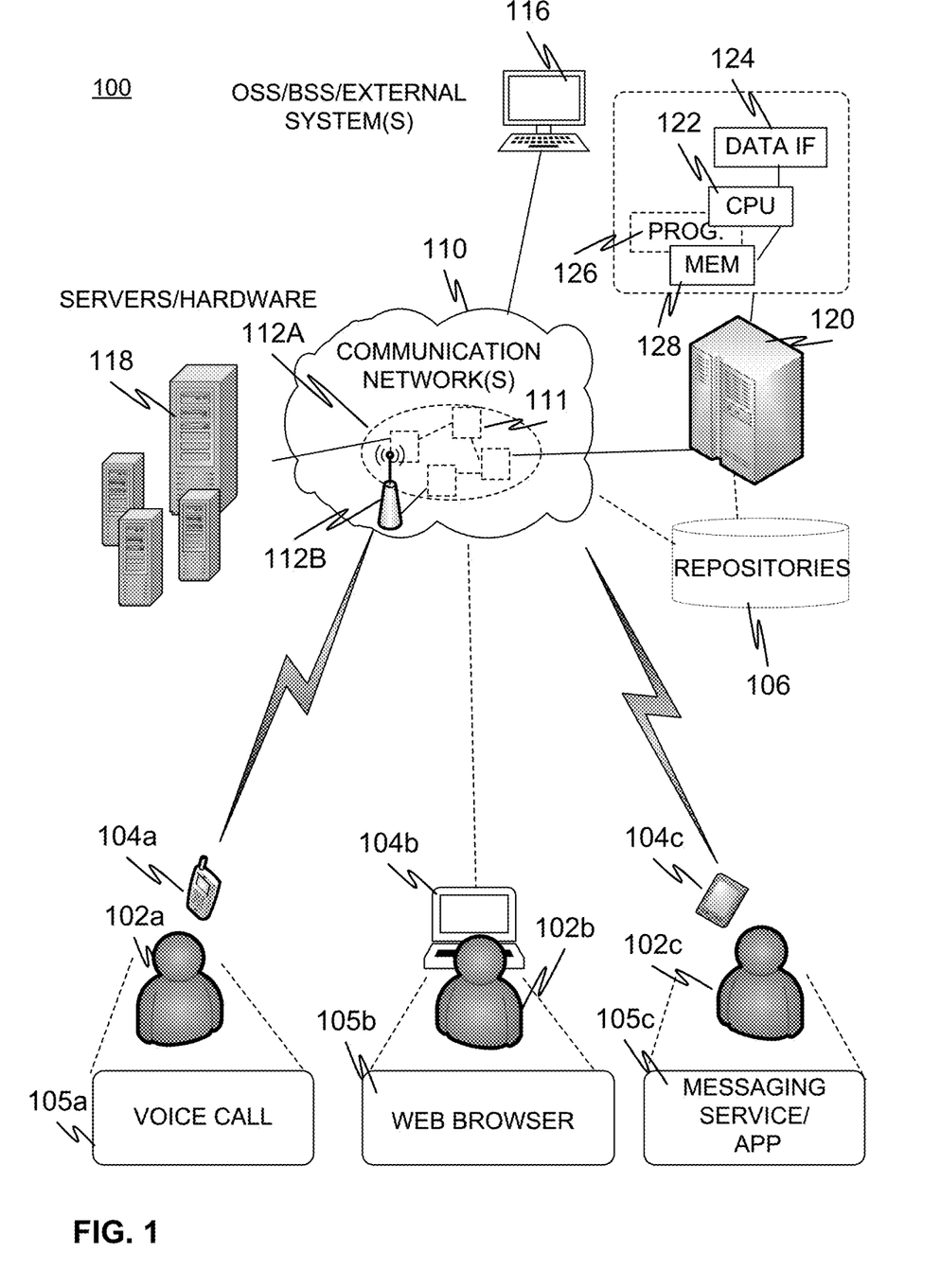
FIG. 1 illustrates one example of network environment and related use context wherein various embodiments of the present invention may be implemented and utilized.

A plurality of further elements not independently depicted in FIG. 1 may also be comprised in the network 110, with reference to e.g. various policy control, traffic analysis and/or charging functionalities—offering components.

Figure 4:
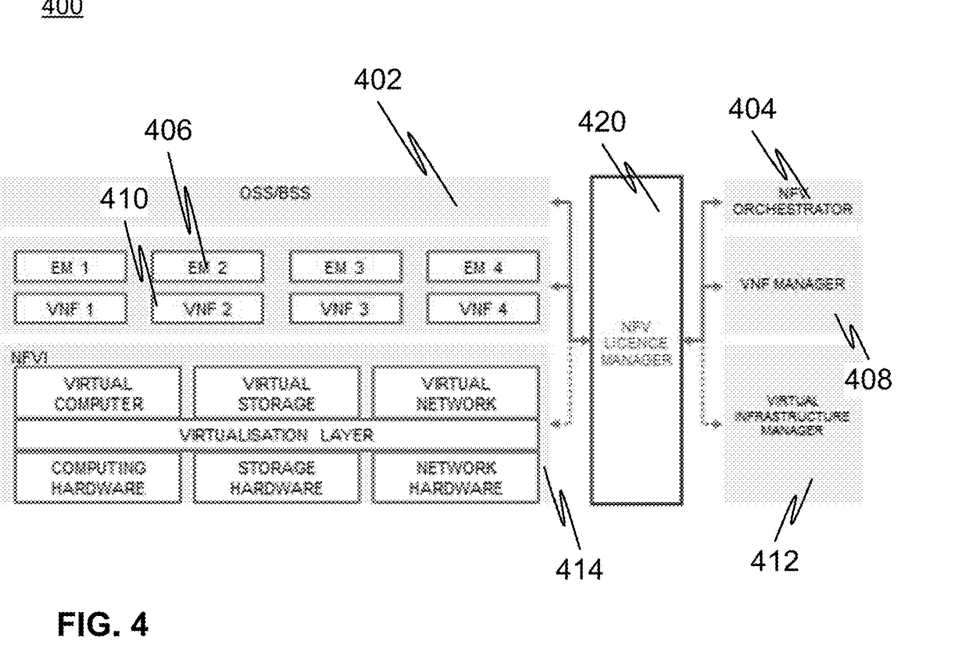
FIG. 4 illustrates an embodiment of a licence management arrangement in accordance with the present invention and related use environment in terms of at least operably connected functional entities.

FIG. 4 illustrates, at 400, possible use context and embodiment of the arrangement 420 in accordance with the present invention for usage control of resources, such as processing, data transfer and/or storage resources, in the network 110 e.g. from the standpoint of licence management and related task distribution conforming to the terms and conditions of associated licences.

The arrangement 420 may generally correspond to the one 120 of FIG. 1 and thus include e.g. one or more servers and in some embodiments optionally host various functionalities, such as at least portion of NFV orchestrator 404. Alternatively or additionally, the arrangement 420 may be operably connected to functionalities external to the arrangement 420 by means of suitable interfaces and/or APIs, for example.

The figure shows how the arrangement 420 may in some preferred embodiments be positioned, or 'mapped', relative to the afore-discussed ETSI NFV architectural reference framework. Indeed, it 420 may be physically implemented or at least logically considered (if technical realization is integral with e.g. particular MANO platform and orchestrator 404) an entity that operatively connects, in terms of e.g. communication connections, with a plurality of systems and entities with reference to a number of MANO related entities (orchestrator 404, VNF manager 408 and/or VIM 412, for instance), NFVI 414, VNF(s) 410, EM(s) 406, and external support, reporting or control/management systems (e.g. OSS/BSS 402).

Accordingly, the arrangement 400 may be configured to obtain information regarding e.g. on-boarded and/or instantiated network services or related VNFs by fetching or receiving it, in addition to or instead of at least partially internally determining it, from a number of applicable entities holding that information, such as any of the aforementioned entities including NFV orchestrator 404 and/or VNF manager 408.

The arrangement 400 may also correspondingly obtain (fetch, receive, derive, etc.) information on available VNF licence(s) e.g. from an internally hosted or external entity such as a licence pool, VNF vendor system, or (licence) procurement or supply chain management system.

Yet, the arrangement 400 may be configured to obtain network resource information indicative of e.g. usage of resources in the network. The usage may refer to past usage, current usage, and/or estimated (predicted based on extrapolating the current situation, for instance) or indicated (e.g. planned) future usage. The information may again be obtained, or specifically received, from external entities or be at least partially locally determined by the arrangement 400.

The arrangement 400 may then further determine, optionally responsive to a fulfillment of a trigger condition such as a notified or detected change in the resource information and/or a licence becoming available, whether a current licence allocated to an existing instance of a VNF is better, according to a number of used criteria, than the same instance but with the available, different licence, or should the existing instance be replaced with new VNF instance allocated with the available licence (which preferably incorporates terminating the existing instance). The criteria may be based on the obtained network resource information such as resource usage information.

Accordingly, the arrangement 400 may be configured to provide control instructions or other data to one or more connected or hosted entities to change the existing NFV or VNF configuration, which may incorporate action(s) to replace e.g. an existing licence associated with an VNF instance with other licence, or to replace the VNF instance itself with other VNF instance, which may in turn correspond to the VNF instance to be replaced or differ therefrom in terms of related requirements or capabilities, for example. The other VNF may optionally be from a different vendor than the one to be replaced (if not from the same). In case the outcome of the determination was that the existing VNF or licence associated therewith is unnecessary or basically sub-optimal to change, the VNF instances and licence allocation may remain as is.

The aforesaid determinations may be executed upfront so that not until a future instant, the change is implemented, although being at least partially decided already earlier. For example, in some scenarios the arrangement may be notified about a desired/intended future change in the resource utilization, whereupon the more optimum NFV/VNF configuration may be determined beforehand to be activated (taken into use) at an instant when the change is about to substantially occur, occurs and shortly thereafter.

In some embodiments, e.g. supervised or unsupervised type machine learning or other forms of artificial intelligence may be utilized in making the determinations or generally optimizing the usage of software components, such as VNFs, and associated licences. For example, machine learning may be applied in determining or predicting e.g. the current or future state of one or more network elements and/or related software components in terms of e.g. load/extent of usage, availability, other usage statistics, and/or licence related aspects such as the nature or level match between the current, intended or future usage of a network element or a VNF hosted by it and the associated terms and conditions of allocated or available VNF licences. Applicable machine learning techniques include e.g. various clustering algorithms, artificial neural networks, or specifically, deep learning.

Figure 5:
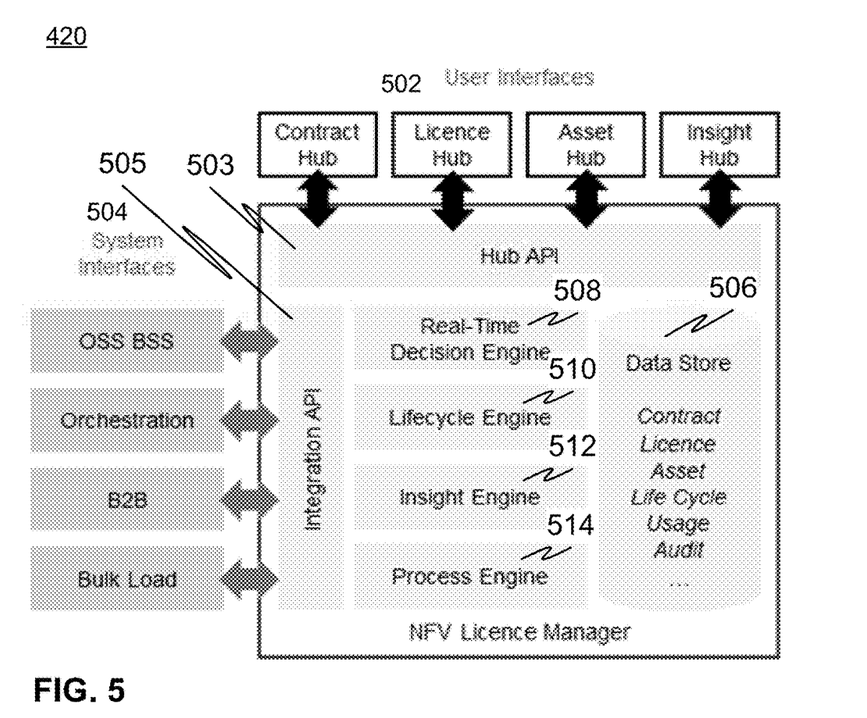
FIG. 5 illustrates potential internals and interfaces of an embodiment of a licence management arrangement in accordance with the present invention.

FIG. 5 illustrates potential, still merely exemplary, internals and interfaces of an embodiment of the licence allocation controlling arrangement 420, or (NFV) licence manager, in accordance with the present invention. The underlying backend technology or platform upon which the functionalities of the arrangement 420 are built may include e.g. Apache-based solutions with reference to Kafka™, Spark™, and Cassandra™.

User interfaces 502 for interaction with the user community of the arrangement 420 may include, be included in, utilize, or connect to any one or more elements selected from the group consisting of: contract hub, licence hub, asset hub, and insight hub.

The hubs may herein refer to e.g. online repositories and/or connection points containing or providing access to information on various topics, such as software or specifically VNF licences, as listed above. One or more of the hubs may be included in the arrangement 420 or be external thereto.

Accordingly, one or more feasible interfaces such as API(s) 503 may be provided in the arrangement for interfacing with the hubs and/or user devices/systems.

A merely exemplary list of supported use case themes involving the user community, available via user interfaces and/or hubs, includes the following elements that may be selectively implemented by the arrangement 420 depending on each particular embodiment thereof: define/load vendor/contract (data), define or load licence policy, define/load lifecycle policy API services for licence allocation/de-allocation, view current licence compliance, view licence consumption data (trends, breaches, audit, etc.), view system health, view asset inventory, view competitive vendor comparisons, view asset/licence topology heat maps, and "what-if" modelling of vendor swaps (involving e.g. software component such as VNF/related licence change).

From the standpoint of system integration and various system interfaces 504 as shown in the figure, at least one integration API 505 may be provided with reference to e.g. a number of REST API(s) for supporting any one or more of the following use case themes: individual licence allocation/de-allocation (release), individual licence query, group licence allocation/de-allocation, vendor selection based on provided selection criteria, import control/licence/usage data, and on-demand licence procurement from B2B other applicable channel.

The arrangement 420 may include a number of functional modules, or engines, for real-time decisions 508, lifecycle management 510, insight 512 (enabling e.g. different queries and executing analytics), and processes 514 (managing processes and related workflows, e.g. having regard to business processes).

Yet, at least one data repository 506 (see 106 of FIG. 1) in the form of e.g. a database of selected type and format for storing various data items, such as licence data, may be provided as shown.

For example, existing linkage, or "registration", between the VNFs or VNF instances and licences associated therewith may be stored therein, indicative of e.g. a VNF (instance) identifier and a corresponding licence identifier.

The repository 506 may comprise an embodiment of afore-discussed licence pool indicative of available licences (unallocated or at least ready for rapid re-allocation).

Alternatively or additionally, information indicative of e.g. the linkage between existing VNF instances and licences allocated thereto may be stored in a data repository or inventory associated with e.g. NFVO 204, such as NFV instances repository 204c.

The various modules/engines disclosed above may optionally utilize selected machine learning techniques as contemplated hereinbefore.

Figure 6:
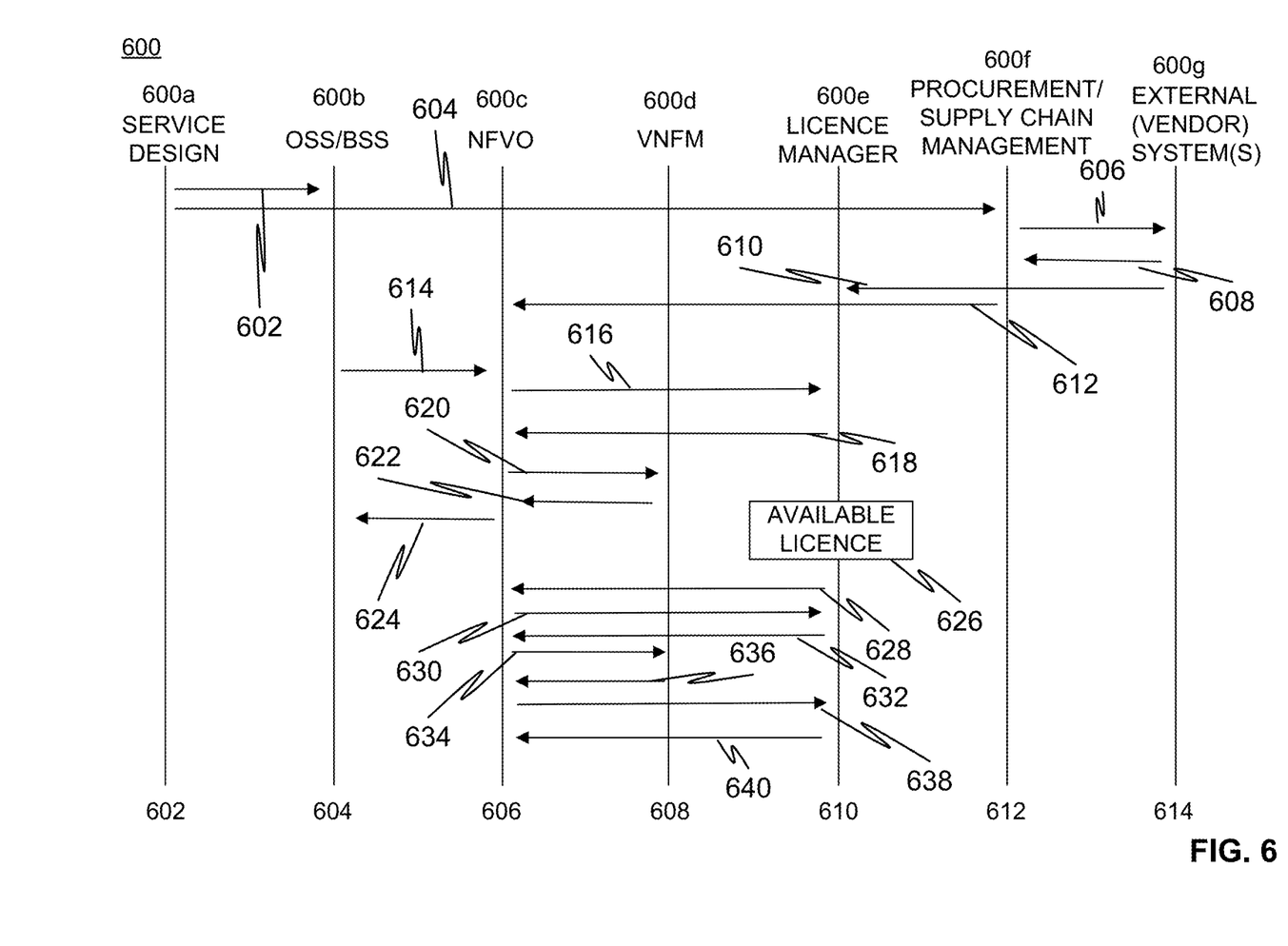
FIG. 6 illustrates, via a signaling chart, one embodiment of control over the usage of software components in the network environment in accordance with the present invention, involving licence-based deliberations.

FIG. 6 illustrates at 600, utilizing a signaling chart, one embodiment of control over the usage of software components in a network environment and related arrangement or system in accordance with the present invention, involving licence-based deliberations.

At 602, e.g. service design(er) entity 600a, comprising e.g. an electronic system, may indicate by associated data transfer a need for building a network service to an OSS/BSS 600b. The network service may require a number of VNFs or generally target functionalities implementing suitable functions to be acquired. At 604, the designer 600a or e.g. the OSS/BSS 604 may thus signal a related request to a procurement or supply chain management system 600f, or other system, which takes care of acquiring the necessary VNF(s) and/or related licence(s) to the present system by initiating e.g. a tender process and/or contacting 606 an external VNF vendor (supplier) system, for instance, which is then capable of providing 608 selected VNF(s) to the present system. At 610, licence data corresponding to the acquired VNF(s) may be provided to a licence manager 600e of the present system, either directly from the vendor 600g or via the procurement 600f, for instance. The licence data may be included e.g. in a licence pool as discussed hereinbefore. At 612, the procurement or other entity may signal NFVO 600c of the present system to onboard the obtained VNF(s).

At 614, a request to initiate network service deployment (instantiation) is provided to the NFVO 600c. At 616 and 618, licence allocation to the VNF(s) to be instantiated accordingly takes place by the corresponding request(s) and response(s). The NFVO 600c, the licence manager 600e, and/or some other system entity may keep track of existing licence allocations by maintaining necessary data repository or repositories for the purpose.

It may be first validated whether a licence is available for a desired VNF, and if that is the case, the licence may be associated with the VNF (instance), comprising storing an indication of such association in an applicable inventory, register or other repository as discussed hereinbefore.

At 620, the NFVO 600c requests the VNFM 600d to instantiate the VNF(s), which is acknowledged at 622. The VNF(s) is brought up and running. Item 624 may refer to reporting the outcome of VNF instantiation and/or other actions executed.

The above, merely exemplary, phases were related to generally acquiring and instantiating a VNF that requires or benefits from a licence. The following actions concern re-assessment of current VNF and licence allocation from the standpoint of available licences and related factors such as terms and conditions, cost, etc.

At 626, a VNF licence suitable for allocation to a new instance or to an already existing instance of a VNF becomes available. It may be released from some existing VNF to be terminated or updated in terms of licence, or it may become available through other measures such as acquisition of additional licences from an external vendor 600g having regard to one or more VNFs the vendor 600g supplies to the present system.

As the licence manager 600e may be kept aware of current licence allocations (it may have an internal repository for the purpose and/or it may access e.g. various instance or inventory data maintained by the NFVO 600c) as well as available licences, it may be assigned a task of optimizing licence usage within a target system. The licence manager 600e may indeed be configured to determine whether some substantially existing (already instantiated or to be instantiated) instance of a VNF could or should be updated with the available licence by replacing its current licence or otherwise allocating the available licence as sole or additional licence thereto.

Additionally or alternatively, it may be determined whether a new VNF instance (based on the same VNF or different VNF) could or should be instantiated and allocated with the available licence, whereafter the existing the VNF instance could be terminated (de-instantiated) and current licence associated therewith released and returned to the pool for future use, for instance.

Various potential criteria based on e.g. licence terms and conditions and network resource information utilized for determining whether such changes in VNF or licence allocations should be done have been discussed extensively hereinbefore and are therefore not repeated.

At 628, the licence manager 600e or other entity may execute the necessary determinations and in case current VNF and/or licence situation seems to benefit from an update, it may inform the NFVO 600c accordingly about such opportunity.

In response, at 630 the NFVO 600c requests for assignment of the available licence to an existing or new VNF instance, whereto the licence manager 600e answers, generally e.g. as in items 616 and 620.

At 634, the NFVO 600c instructs the VNFM 600d to take the necessary actions (instantiate new VNF, de-instantiate existing VNF, etc.). The VNFM 600d sends an acknowledgement at 636.

At 638, the NFVO may inform e.g. the licence manager 600e to release the licence(s) that do not have to remain allocated to the existing VNF(s) anymore due to the above update procedure. Such licence(s) may be returned to the licence pool for reuse, for example. An acknowledgement back to the NFVO 600c may be sent at 640.

Figure 7:
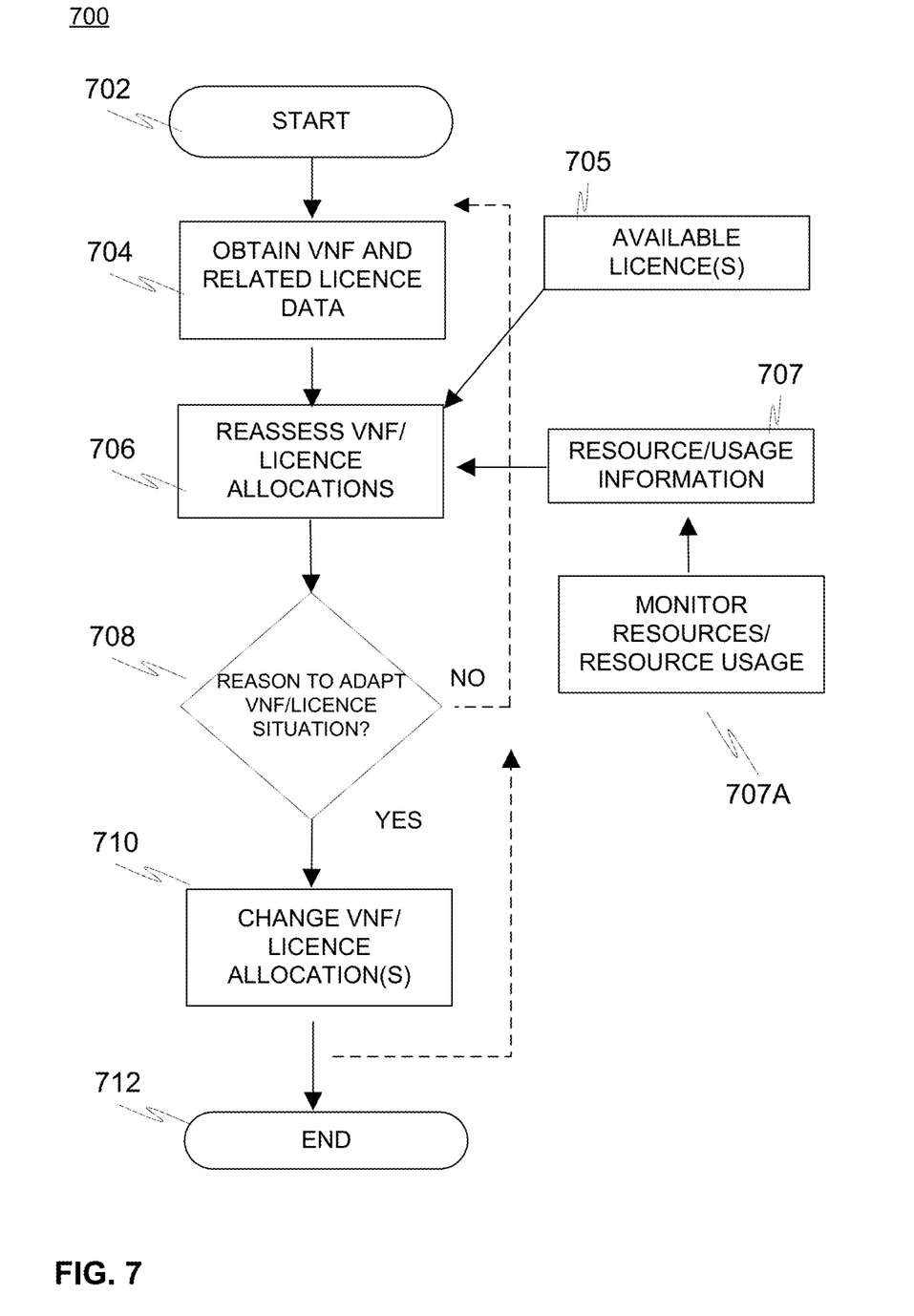
FIG. 7 is a flow diagram concerning an embodiment of a method in accordance with the invention.

FIG. 7 illustrates, at 700, items that may be performed in a method according to an embodiment of the invention. The method may be performed by an electronic arrangement, such as a device or a system of a number of at least operatively connected devices, as described hereinearlier. At start-up 702, different initial preparatory tasks may be executed. The executing arrangement 120 of FIG. 1, for example, may be configured with the necessary hardware and software (with reference to a number of servers, for example) and provided in the target network with necessary connections to other entities in the network.

At 704, first information indicative of instantiated virtualized network functions (VNF) and licences associated therewith is obtained. The information may be obtained through receiving or fetching it from various entities of e.g. MANO platform, such as the orchestrator, or specifically, e.g. instance data holding entity or entities (e.g. NFV instances entity) thereof.

At 705, second information listing or describing at least one available VNF licence is obtained (there may be several available licences). The information may be received or fetched from a licence repository such as the aforementioned licence pool, for example, and/or from external entities such as VNF vendor systems, cloud service providers, and/or hardware vendors.

At 706, it is determined, based on the obtained first and second information, whether a licence currently allocated to an existing instance of a VNF or the existing VNF instance itself is to be replaced with the available licence or new instance of the related VNF associated with the available licence, respectively, wherein a number of selected criteria are utilized to compare the currently allocated licence with the available licence having regard to the concerned terms and conditions as well as network resource information including usage information regarding the existing instance of the VNF based on data obtained from the network. For making the assessment, various resource information 707 may be obtained through 707A receiving, fetching and/or deriving it from the available information sources and/or available data.

Preferably, the network resource information comprises usage information regarding past, current, intended, desired, and/or estimated future usage (e.g. level and/or type of usage) of a number of network elements and/or specifically VNFs typically run on virtual machines hosted by server type computer devices, advantageously including at least the aforesaid existing instance of the VNF.

Responsive to a positive determination based on which it is indeed advantageous to make changes in the current VNF and/or licence allocations, at 710 the available licence is allocated to the existing VNF instance or to said new instance of the related VNF that is instantiated, further releasing the licence currently allocated to the existing VNF instance and in the latter case also de-instantiating the existing VNF instance.

The method execution is ended at 712.

The dotted loopback arrows depict the potentially repetitive nature of the execution of various method items. For example, the ongoing situation regarding the VNFs, related licences, and their allocation from the standpoint of network resources and their usage may be monitored either intermittently or more or less continuously, to optimize the VNF and licence allocations dynamically and flexibly upon need in favour of enhanced network performance, for example.

The present invention has been explained above with reference to a number of embodiments, and several advantages of the invention have been demonstrated. It is clear that the invention is not only restricted to these embodiments, however, but comprises further embodiments within the spirit and scope of inventive thought and especially the following patent claims.

The features recited in dependent claims are mutually freely combinable unless otherwise explicitly stated or being clear to a person skilled in the art due to inherent incompatibility.

The invention claimed is:

1. An electronic arrangement for dynamically and automatically controlling the usage of software components in connection with a network function virtualization (NFV) platform in a communications network comprising a mobile network, the arrangement comprising at least one data interface for transferring data, at least one processing unit for processing instructions and other data, and memory for storing the instructions and other data, said at least one processing unit being configured, in accordance with the stored instructions, to cause:

obtaining first information indicative of instantiated virtualized network functions (VNF) and licences associated therewith, and second information indicative of a VNF licence that is available for allocation to an instance of a related VNF in accordance with terms and conditions as stipulated by the VNF licence;

determining, based on the obtained first and second information, between whether a licence currently allocated to an existing instance of a VNF is to be replaced with the available licence or the existing VNF instance is to be replaced with a new instance of said related VNF associated with the available licence, wherein a number of selected criteria are utilized to compare the currently allocated licence with the available licence having regard to the concerned terms and conditions as well as network resource information including usage information regarding the existing instance of the VNF based on data obtained from the network; and (1) responsive to the determination being positive that a licence currently allocated to an existing instance of a VNF is to be replaced, allocating the available licence to the existing VNF instance, the licence currently allocated to the existing VNF instance being released, and (2) responsive to the determination being positive that the existing VNF instance is to be replaced, allocating the available licence to said new instance of said related VNF that is instantiated, the licence currently allocated to the existing VNF instance being released and the existing VNF instance being de-instantiated.

2. The arrangement of claim 1, wherein at least portion of said first information is obtained from virtualization management and orchestration platform (MANO) of the network, comprising NFV orchestrator and/or at least one catalog entity thereof, with which the arrangement is at least operably connected.

3. The arrangement of claim 1, wherein at least portion of said second information is obtained from a licence pool repository storing licence data indicative of at least available, non-allocated VNF licences, said arrangement being at least operably connected to the licence pool repository that is comprised in said electronic arrangement.

4. The arrangement of claim 1, wherein the related VNF differs from the existing, already instantiated VNF, but offers at least similar type and/or level of functionality therewith.

5. The arrangement of claim 1, wherein the related VNF matches to the existing, already instantiated VNF.

6. The arrangement of claim 1, wherein said allocating comprising exclusively associating a licence key identifying said available licence with said existing VNF instance or said new VNF instance.

7. The arrangement of claim 1, wherein the network resource information utilized includes or indicates at least one element selected from the group consisting of: available computational resources, available memory resources, available data transfer resources, used computational resources, used memory resources, used data transfer resources, resources utilized or required by the existing instance of the VNF, resources available within host or domain, such as PoP or NFVO domain, of the existing instance of the VNF, usage location of the existing instance of the VNF, location of the existing instance of the VNF, host or domain location of the existing instance of the VNF, user of the existing instance of the VNF, number of users of the existing instance of the VNF, extent of usage of the existing instance of the VNF per time period, number of usage times of the existing instance of the VNF per time period, and resources utilized or required by the available licence or said related VNF executed under said available licence.

8. The arrangement of claim 1, wherein said number of criteria incorporate network resource information, the type and/or extent of available, used or required resources and/or distance between locations.

9. The arrangement of claim 1, wherein said determining incorporates determining characteristics, such as type and/or extent, of estimated, intended, or desired future usage of at least the existing VNF instance, based on current usage, and comparing the determined characteristics with available network resources and/or terms and conditions of the currently allocated licence.

10. The arrangement of claim 9, configured to estimate whether the existing VNF instance and the licence currently allocated thereto can cater for the characteristics.

11. The arrangement of claim 1, wherein said determining incorporates determining characteristics, such as extent, of estimated, intended, or desired future usage of at least the existing VNF instance, and comparing the determined characteristics with available network resources and/or terms and conditions of the available licence.

12. The arrangement of claim 11, configured to estimate whether the available licence and instance of said related VNF, matching to the existing VNF already instantiated, can cater for the characteristics.

13. The arrangement of claim 1, wherein said determining incorporates determining whether the currently allocated licence or the available licence will serve characteristics of estimated, intended, or desired future usage of at least the existing VNF instance, further of the additional usage the related VNF different from the existing VNF could enable, better according to said number of criteria.

14. The arrangement of claim 1, wherein making said positive determination involves finding the existing or new VNF instance associated with the available licence superior to the existing VNF instance associated with the currently allocated licence based on at least one criterion selected from the group consisting of: lower resource usage, lower load, better user experience, lower latency, higher throughput, lower transmission delay, higher or lower reserve capacity, and higher communication rate.

15. The arrangement of claim 1, wherein said determining incorporates determining the cost, by means of at least one cost function, of current usage and/or estimated, intended, or desired future usage of at least the existing VNF instance in contrast to the cost of such usage but based on replacing the currently allocated licence with the available licence or replacing the existing VNF instance with a new VNF instance associated with the available licence.

16. The arrangement of claim 15, wherein the available licence is allocated to the existing instance of the VNF or to the new instance of said related VNF in case the associated cost is lower in contrast to the currently allocated licence.

17. The arrangement of claim 16, wherein the cost includes at least one element selected from the group consisting of: financial cost, and technical cost, determined based on the network resource information.

18. The arrangement of claim 1, wherein the terms and conditions of currently allocated and/or available licence indicate at least one element selected from the group consisting of: maximum number of users, maximum number of simultaneous users or sessions, maximum number of users in general, maximum throughput, maximum extent of usage such as tasks executed per time period, data processed or output, geographical extent of allowed usage, allowed or prohibited usage hours per time related constraint such as a day, allowed number of usage times per time period, and allowed method of monitoring, reporting or validating licence usage, such as declarative licensing.

19. The arrangement of claim 1, comprising an NFV orchestrator or NFV orchestration platform, incorporating MANO compliant platform.

20. The arrangement of claim 1, comprising at least one data repository hosting at least one catalog indicative of on-boarded network services (NS) and virtualized network functions (VNF) available for use.

21. The arrangement of claim 1, comprising at least one data repository indicative of current VNF instances and network service instances deployed.

22. The arrangement of claim 1, wherein at least portion of said second information is obtained from a VNF vendor system operably connected to the arrangement.

23. The arrangement of claim 1, being at least operably connected, via applicable interface, to at least one element selected from the group consisting of: OSS, BSS, procurement system or database, VNF vendor system, contract system or database.

24. The arrangement of claim 1, configured to provide an API, REST based API, for transferring licence data or licence related control data, including allocation, release, procurement, query or usage data.

25. A method for dynamically and automatically controlling the usage of software components by an electronic arrangement in connection with a network function virtualization (NFV) platform in a communications network comprising a mobile network, said method comprising:
    obtaining first information indicative of instantiated virtualized network functions (VNF) and licences associated therewith, and second information indicative of a VNF licence that is available for allocation to an instance of a related VNF in accordance with terms and conditions as stipulated by the VNF licence;
    determining, based on the obtained first and second information, between whether a licence currently allocated to an existing instance of a VNF is to be replaced with the available licence or the existing VNF instance is to be replaced with a new instance of said related VNF associated with the available licence, wherein a number of selected criteria are utilized to compare the currently allocated licence with the available licence having regard to the concerned terms and conditions as well as network resource information including usage information regarding the existing instance of the VNF based on data obtained from the network; and
    responsive to the determination being positive that the existing VNF instance is to be replaced, allocating the available licence to said new instance of said related VNF that is instantiated, the licence currently allocated to the existing VNF instance being released and the existing VNF instance being de-instantiated.

26. Software product, embodied in a non-transitory computer readable carrier medium, comprising instructions causing a computer to execute method items of claim 25.

* * * * *